United States Patent Office 3,347,843
Patented Oct. 17, 1967

3,347,843
WATER-SOLUBLE REACTIVE DYESTUFFS CONTAINING HALOPYRIDAZINE CARBOXAMIDE GROUPS
Heinz Bender, Bergen-Enkheim, Kreis Hanau, Richard Fleischhauer, Frankfurt am Main, Fechenheim, and Rudi Beyerle, Bruchkobel, Kreis Hanau, Germany, assignors to Cassella Farbwerke Mainkur Aktiengesellschaft, Frankfurt am Main, Fechenheim, Germany, a company of Germany
No Drawing. Filed June 18, 1964, Ser. No. 376,268
Claims priority, application Germany, July 2, 1963, C 30,319
7 Claims. (Cl. 260—154)

This invention relates to new, water-soluble, reactive organic dyestuffs that contain at least one acyl residue originating from a halopyridazine-carboxylic acid.

We have found that new, valuable, water-soluble, organic dyestuffs are obtained by introducing residues of halopyridazine-carboxylic acids into organic dyestuffs or dyestuff intermediates bearing primary or secondary amino groups and by building up optionally the dyestuffs from the acylated intermediate products thus obtained, whilst choosing the components in such a manner that at least one of them contains one or more water-solubilizing groups.

These dyestuffs containing halopyridazine residues possess the remarkable property of yielding wet-fast dyeings, when applied to materials containing hydroxyl groups, such as cellulose, as e.g. cotton or regenerated cellulose, such as viscose or cuprammonium rayon. These materials are treated with the solutions or printing pastes of the dyestuffs as claimed and the material thus impregnated or printed is subjected to a steaming process, in particular in the presence of alkaline agents, or dry-heated to higher temperatures. Furthermore, the fixation of the dyestuffs may be done, when working in the presence of alkali, at temperatures ranging below 100°. It is also possible, when heating to higher temperatures, to utilize weakly active alkalis, such as sodium bicarbonate or sodium carbonate, and, when dyeing at lower temperatures (pad-batch method) to use in particular caustic alkalis.

The dyestuffs under the present invention distinguish themselves particularly by furnishing, when applied according to the so-called thermofixing process—i.e. when the materials printed or impregnated therewith are dry-heated to temperatures of above 100°—specially full dyeings and prints that possess very good fastness properties.

Halopyridazine-carboxylic acids suitable as acyl residues in the dyestuffs under the present invention correspond to the following general formula

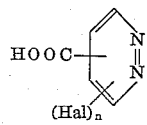

wherein $n$ is 1, 2, or 3, and Hal is chlorine or bromine.

The following exemplifies some halopyridazine-carboxylic acids of such type:

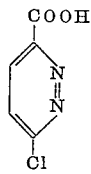 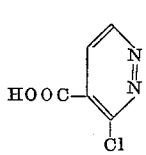 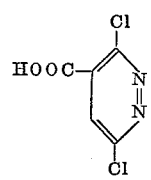

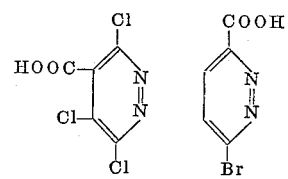

Before these carboxylic acids are introduced into the dyestuff or the dyestuff intermediate product, they are converted, as is known, into their functional derivatives, for instance, into the acid halides, by treating them with thionyl or phosphoryl halides.

The compounds thus obtained are e.g. reacted with diamines, such as 1,3-diaminobenzene-4-sulfonic acid or 1,4-diaminobenzene-2-sulfonic acid, whereby the reaction is directed in such a manner that only one amino group is acylated and diazotizable monoamino-acyl-amino compounds are obtained that may serve as diazo compounds for the formation of azo dyestuffs. It is also possible to react aromatic nitro-amino compounds, e.g. 3- and 4-nitraniline, with the above mentioned halopyridazine carboxylic acid derivatives and to reduce the compounds obtained to give the amines, thus obtaining diazo compounds without solubilizing groups.

On the other hand, the above-mentioned reactive residues may be introduced into amino-hydroxy compounds of the benzene and particularly the naphthaline series, such as 1-amino-8-hydroxy-naphthaline-3,6- or -4,6-disulfonic acid or 1-amino-8-hydroxy-naphthaline-4-, -5-, or -6-monosulfonic acid, 2-amino-5-hydroxy-naphthaline-7-sulfonic acid, 2-amino-8-hydroxy-naphthaline-6-sulfonic acid, 1-amino-5-hydroxy-naphthaline-7-sulfonic acid, 2-amino-6 - hydroxy - naphthaline - 8 - sulfonic acid, 2-amino-6-hydroxy - naphthaline - 4 - sulfonic acid, 2-amino-3-hydroxy-naphthaline-6-sulfonic acid, 1-amino-7-hydroxy-naphthaline-3-sulfonic acid, 3-amino-phenol-4-sulfonic acid, 3-aminophenol-6-sulfonic acid.

The acrylated amino-hydroxyaryl-sulfonic acids thus obtained are used as coupling components for azo dyestuffs.

Residues of halopyridazine carboxylic acids may also be introduced directly in dyestuffs containing primary or secondary amino groups.

Such dyestuffs may pertain to the most diversified classes, such as the azo, anthraquinone, nitro, and cyanine, in particular to the phthalocyanine series. The azo series comprises mono, dis, and polyazo dyestuffs.

As far as the dyestuffs contain metallizable groups, they may, after the introduction of halopyridazine carboxylic acid residues, be after treated with metallizing agents, such as chromium, cobalt, and copper compounds, whereby the metals may be contained in the dyestuffs in a molar ratio from about 1:1 to 1:2. It is often useful to effect the metallization prior to the reaction with the halopyridazine carboxylic acid derivatives.

The new dyestuffs may serve, apart from their use as reactive dyestuffs for cellulose fibers, also for dyeing animal or synthetic fibers, such as wool, silk, leather, polyamides, polyurethanes.

For a better understanding of the nature and objects of this invention, reference should be made to the accompanying examples which are of an illustrative rather than a limiting nature. Unless otherwise stated, all parts specified are parts by weight and all percentages given are percentages by weight; temperatures given are in degrees centigrade.

Example 1

18.8 kg. 2,4-diaminobenzene-1-sulfonic acid in the form of its sodium salt are dissolved in 200 l. water with neutral reaction. After the addition of 10 kg. anhydrous sodium acetate and acidification with acetic acid, about 19 kg. 3-chloropyridazine(1,2)-6-carboxylic acid halide having a melting point of 80–100° and prepared from the corresponding acid and thionylchloride are added at 0–3°. The mixture is stirred for several hours, the liberated acid being neutralized by slowly adding an aqueous solution of sodium carbonate. Then the sodium salt of the 1-amino-3-(3'-chloropyridazine(1',2')-6'-carboxamido) - benzene-6-sulfonic acid is precipitated by sodium chloride, filtered off, and washed with a diluted sodium chloride solution, until the 2,4-diaminobenzene-1-sulfonic acid is no longer detectable in the filtrate. After drying, a colorless water-soluble powder is obtained which is diazotizable.

If, instead of 3-chloropyridazine(1,2)-6-carboxylic acid chloride, the corresponding amount of 3,6-dichloropyridazine(1,2)-5-carboxylic acid chloride, having a melting point of 105–106°, is used, the 1-amino-3-(3'6'-dichloropyridazine(1',2')-5'-carboxamido)-benzene - 6 - sulfonic acid of similar properties is obtained.

In quite an analogous manner, the 2,5-diamino-benzene-1-sulfonic acid can be reacted in the presence of excess sodium bicarbonate with 3,6-dichloropyridazine(1,2)5-carboxylic acid chloride to give the analogous monoacyl compound.

A quantity corresponding to 32.9 kg. 100% 1-amino-3-(3'chloropyridazine(1',2')-6'-carboxamido)-benzene - 6 - sulfonic acid of the condensation product obtained above is mixed with water at 15–20° and, after the addition of approx. 30 liters of 10 n-hydrochloric acid diazotized by slowly adding an aqueous solution of 6.9 kg. of sodium nitrite. The diazo suspension obtained is combined with an aqueous solution of 33 kg. 1-(2',5'-dichloro-4'-sulfophenyl)-3-methyl-5-pyrazolone containing excess sodium acetate. This mixture is stirred for several hours. The dyestuff is separated by heating and salting out with potassium chloride, and filtered off. It forms after drying a yellow, water-soluble powder that yields, when printed on cotton in the presence of urea, alginate thickening, and sodium carbonate or sodium hydroxide solution and subsequent drying, steaming, rinsing, and soaping, greenish yellow dyeings being fast to light and wet processing.

The corresponding dyestuffs, in which 1-(4'-sulfophenyl)-3-methyl-5-pyrazolone or 1-(4'-sulfophenyl)-5-pyrazolone-3-carboxylic acid is used as a coupling component, give prints of a more reddish yellow shade and otherwise similar properties.

The following table enumerates some more shades which are obtained with dyestuffs containing diazo components prepared according to the method described in paragraph 1 or 2, together with the residues of the 3-chloropyridazine(1,2)-6-carboxylic acid or 3,6-dichloropyridazine(1,2)5-carboxylic acid, but other coupling components:

| Coupling Component | Shade on Cotton |
| --- | --- |
| 5-pyrazolone-3-carboxylic acid | Greenish yellow. |
| 1-naphthol-3-sulfonic acid | Scarlet. |
| 1-naphthol-4-sulfonic acid | Do. |
| 1-naphthol-3,8-disulfonic acid | Do. |
| 1-naphthol-3,6-disulfonic acid | Do. |
| 1-naphthol-4,8-disulfonic acid | Red. |
| 2-naphthol-6,8-disulfonic acid | Orange. |
| 1-acetylamino-8-naphthol-3,6-disulfonic acid | Bluish red. |
| 1-benzoylamino-8-naphthol-3,6-disulfonic acid | Do. |
| 1-benzoylamino-8-naphthol-4,6-disulfonic acid | Do. |
| 1-amino-8-naphthol-3,6-disulfonic acid ←(coupled in acid ← and alkaline medium.) | Greenish blue-black. |
| 1-amino-8-naphthol-4,6-disulfonic acid ←(coupled in acid and alkaline medium.) | Reddish blue-black. |
| 1,3-diaminobenzene-4-sulfonic acid ←(coupled in acid and alkaline medium.) | Orange. |
| 2-amino-5-naphthol-7-sulfonic acid ←(coupled in acid and alkaline medium.) | Brick red. |
| 1,3-dihydroxybenzene ←(coupled in acid and alkaline medium.) | Orange brown. |
| 1,3-diaminobenzene ←(coupled in acid ← and alkaline medium.) | Red brown. |
| 1,3-diamino-4-methyl-benzene ←(coupled in acid ← and alkaline medium.) | Do. |
| →1-amino-8-naphthol-3,6-disulfonic acid ← | acid medium 4-nitraniline-2-sulfonic acid. | Black. |
| →1-amino-8-naphthol-3,6-disulfonic acid ← | acid medium 2-nitraniline-4-sulfonic acid. | Do. |
| 2-amino-8-naphthol-6-sulfonic acid (coupled in acid medium) | Bluish red. |
| 2-amino-8-naphthol-3,6-disulfonic acid (coupled in acid medium) | Do. |

Example 2

23.9 kg. 2-amino-5-hydroxy-naphthaline-7-sulfonic acid are dissolved neutral with water together with the necessary amount of sodium hydroxide solution. About 15 kg. anhydrous sodium acetate are added to the solution and at 5–10° about 15 kg. of the chloride of the 3-chloropyridazine(1,2)-6-carboxylic acid obtained therefrom with thionyl chloride are introduced. By slowly adding a solution of sodium carbonate and stirring for several hours, the reaction is completed and the reaction product salted out with sodium chloride.

It is filtered off, washed with an aqueous sodium chloride solution to remove little amounts of non-reacted 2-amino-5-hydroxy-naphthaline-7-sulfonic acid, and dried in the vacuum. Then a nearly colorless, water-soluble powder is obtained which is no longer diazotizable and can be used as a coupling component, yielding orange coloring reactive dyestuffs.

Instead of the 2-amino-5-hydroxy-naphthaline-7-sulfonic acid, the 1-amino-5-hydroxy-naphthaline-7-sulfonic acid or 2-amino-8-hydroxy-naphthaline-6-sulfonic acid, 2-methylamino-5-hydroxy-naphthaline - 7 - sulfonic acid, 1-amino-6-hydroxy-naphthaline-4-sulfonic acid, 2-amino-6-hydroxy-naphthaline-8-sulfonic acid may be reacted analogously with 3-chloropyridazine(1,2)-6-carboxylic acid chloride.

In place of the latter, there may be employed the halides deriving from the other halopyridazine-carboxylic acids mentioned above, in particular the chloride of the 3,6-dichloropyridazine(1,2)-5-carboxylic acid. In an analogous manner 31.9 kg. 1-amino-8-hydroxy-naphthaline-3,6-disulfonic acid are reacted with one of the chlorides of the 3-chloropyridazine(1,2)-6-carboxylic acid, the 3,6-dichloro-pyridazine-5-carboxylic acid, or the 2,4,6-trichloropyridazine-5-carboxylic acid, whereby sodium bicarbonate is used as an acid binding agent. After salting out, filtering off, and drying, nearly colorless to yellow grey, water-soluble powders are obtained which may be combined with diazo compounds to form vivid bluish red coloring reactive dyestuffs.

Example 3

17.3 kg. 1-aminobenzene-4-sulfonic acid are diazotized in the usual way. Whilst cooling, the diazo suspension is allowed to run into a solution admixed with excess sodium acetate, of 37 kg. of the condensation product obtained according to Example 2, paragraph 1. The dyestuff formation being completed, the dyestuff is separated by salting out and forms, after filtering off and drying, an orange water-soluble powder that gives, when printed on cotton or rayon staple, in the presence of sodium carbonate or sodium hydroxide solution, urea, and alginate thickening, orange prints that distinguish themselves by good wet and light fastness properties.

If, instead of the 1-aminobenzene-4-sulfonic acid as a diazo component the equivalent quantities of 1-aminobenzene-4-carboxylic acid or 1-aminobenzene-3,4-dicarboxylic acid are used, dyestuffs of a somewhat more reddish orange shade with similar properties are obtained.

Orange dyeing products of similar properties are also obtained by combining, as a diazo component, the 1-amino-3-(3′-chloropyridazine(1′,2′) - 6′ - carboxamido)-benzene-6-sulfonic acid indicated in Example 1 with the coupling components prepared according to Example 2, paragraph 1 or 2 which contain a halopyridazine-carboxylic acid residue, whereas on the other hand a vivid bluish red dyestuff is obtained by using the 1-(3′-chlorcpyridazine(1′,2′)-6′-carboxamido)-8-naphthol - 3,6 - disulfonic acid produced according to Example 2, paragraph 4.

*Example 4*

17.3 kg. 1-amino-benzene-4-sulfonic acid are diazotized in the usual way. The diazo suspension is allowed to run into a neutral solution (about 41 kg. of the sodium salt of the condensation product from 1 mol 2-amino-8-hydroxy-naphthaline-6-sulfonic acid and 1 mol 3,6-dichloropyridazine-5-carboxylic acid chloride) and the dyestuff formation is completed by adding excess sodium acetate and stirring for several hours. After neutralization with potassium carbonate, the dyestuff is precipitated with potassium chloride. It forms, after filtering off and drying, an orange red, water-soluble powder that furnishes, when printed on cotton or regenerated cellulose after dry-heating to 140–160°, rinsing, and soaping, vivid scarlet prints with very good wet fastness properties.

The following table enumerates some examples of dyestuffs that are obtained with the same coupling component but with several other diazo components:

Diazo component: Shade
3-aminobenzene-sulfonic acid _____ Red orange.
2-aminobenzene-sulfonic acid _____ Scarlet.
4-aminobenzoic acid _____ Scarlet.
2-aminobenzoic acid _____ Scarlet.
4-amino-anisol-2-sulfonic acid _____ Red.
2-naphtholamine-1-sulfonic acid _____ Scarlet.
2-naphtholamine-6-sulfonic acid _____ Scarlet.
2-naphtholamine-5-sulfonic acid _____ Scarlet.
2-naphtholamine-7-sulfonic acid_____ Scarlet.
2-naphtholamine-8-sulfonic acid _____ Scarlet.
2-naphtholamine-4,8-disulfonic acid ___ Scarlet.
2-naphtholamine-5,7-disulfonic acid ___ Scarlet.
2-naphtholamine-3,6-disulfonic acid ___ Scarlet.
2-naphtholamine-6,8-disulfonic acid ___ Scarlet.
2-naphtholamine-1,5-disulfonic acid ___ Scarlet.
2-naphtholamine-3,6,8-trisulfonic acid __ Scarlet.
1-aminobenzene-2,4-disulfonic acid ____ Scarlet.
1-aminobenzene-2,5-disulfonic acid ____ Scarlet.
1-aminobenzene - 4 - sulfo-2-carboxylic acid _____ Scarlet.
1-aminobenzene-3,4-dicarboxylic acid __ Scarlet.
2-aminotoluene-4-sulfonic acid _____ Scarlet.
2-aminotoluene-5-sulfonic acid _____ Scarlet.

*Example 5*

34.4 kg. 4,4′-diaminodiphenyl-2,2′-disulfonic acid are tetrazotized. The tetrazo suspension is combined, in the presence of excess sodium acetate, with a solution of the sodium salt of 76 kg. 1′(3′-chloro-pyridazine-(1′,2′)-6′-carboxamido) - 5 - hydroxy-naphthaline-7-sulfonic acid. After the dyestuff formation is completed, the product is precipitated by adding potassium chloride, filtered off, and dried. It forms a dark red, water-soluble powder and furnishes, when printed on cotton in the presence of sodium, carbonate, urea, and alginate thickening, vivid scarlet prints being fast to wet processing and light.

In the following, some further examples of disazo dyestuffs are given in which other tetrazo or coupling components are used:

| Tetrazo Component | Coupling Component | Shade |
|---|---|---|
| 4,4′-diamino-diphenyl-2,2′-disulfonic acid | HO₃S—[naphthalene with OH and NH—CO—dichloropyridazinyl] | Scarlet. |
| Do | HO₃S—[naphthalene with OH and NH—CO—dichloropyridazinyl, different isomer] | Ruby. |
| Do | HO₃S—[naphthalene with OH, NH—CO—dichloropyridazinyl and SO₃H] | Red violet. |
| 4,4′-diamino-diphenyl-3,3′-dicarboxylic acid | Same as above | Navy blue. |
| 4,4′-diamino-diphenyl-3,3′-dihydroxy-acetic acid | do | Blue violet. |
| 4,4′-diamino-stilbene-2,2′-disulfonic acid | do | Do. |
| 4,4′-diamino-diphenyl-ether-2-sulfonic acid | do | Bordeaux. |
| 4,4′-diamino-diphenyl-sulfone | do | Violet. |
| 3,3′-diamino-diphenyl-sulfone-5-sulfonic acid | do | Bordeaux. |
| 3,3′-diamino-diphenyl-sulfone-4,4′-disulfonic acid | do | Do. |

Example 6

50.3 kg. 1-amino-4-(4'-methyl-3'-amino-5'-sulfophenylamino)-anthraquinone-2-sulfonic acid are dissolved with water and the necessary amount of sodium carbonate until netural. Then about 13 kg. sodium bicarbonate are added at 0–5° and about 35 kg. 3,6-dichloro-pyridazine-(1,2)-5-carboxylic acid chloride are introduced, the mixture is stirred for several hours, and the dyestuff is separated by salting out with potassium chloride. Then it is filtered off and dried in the vacuum at a low temperature.

A dark water-soluble powder is obtained that furnishes, when printed on cotton in the presence of sodium carbonate or sodium hydroxide solution, alginate thickening, and urea, after steaming, rinsing, and soaping, reddish blue prints being fast to light and washing.

Dyestuffs of similar properties are obtained by using for the acylation halides of the halopyridazine-carboxylic acids mentioned in the introduction to the specification.

Dyestuffs of a somewhat more reddish blue shade are obtained by starting in the above example from the 1-amino-4(2'-methyl-3'-amino-5'-sulfo-phenylamino) - anthraquinone-2-sulfonic acid.

Starting from the dyestuff obtained by condensation of 1 mol 3,3'-diamino-4-methyl-diphenyl-sulfone-5-sulfonic acid with 1 mol 1-amino-4-bromoanthraquinone-2-sulfonic acid and this product is reacted in the appropriate manner as indicated in paragraph 1 with the halopyridazine-carboxylic acid halides mentioned, blue dyestuffs are obtained that distinguish themselves by a particularly clear shade. With the latter there are obtained very vivid, reddish blue prints of a very good light and wet fastness by the processes customary for dyeing and printing with reactive dyes, e.g. in the presence of sodium hydroxide solution or sodium carbonate, and urea, drying, steaming or dry heating to about 140°, rinsing, and soaping.

If the above mentioned dichloro-pyridazine-carboxylic acid chloride is allowed to react with the monoazo dyestuff produced by the combination of 1 mol of the diazo compound of 2-amino-naphthaline-4,8-disulfonic acid with 1-amino-2-methoxy-5-methylbenzene, an orange brown, water-soluble dyestuff powder is obtained that yields, when printed in the presence of sodium carbonate or sodium hydroxide solution, urea, and alginate thickening, after steaming, rinsing, and soaping, fast reddish yellow prints.

Example 7

A diazo solution prepared in the usual way from 18.9 kg. 1-amino-2-hydroxybenzene-3,5-disulfonic acid is combined with the aqueous solution of the sodium salt of 38 kg. 2-(3'-chloropyridazine(1',2')-6'-carboxamido)-5-hydroxy-naphthaline-7-sulfonic acid in the presence of sodium carbonate. The dyestuff is precipitated with sodium chloride after having been neutralized with acetic acid, it is filtered off and the paste is redissolved in water. Then a solution of 25 kg. crystallized copper sulfate and 16.4 kg. anhydrous sodium acetate are added, the mixture is heated for an hour to 90–100°, and the dyestuff is salted out with sodium chloride. After filtering off and drying, a dark powder is obtained which dissolves in water and yields, when printed on cotton in the presence of sodium carbonate, urea, and alginate thickening, after steaming or dry heating to about 140°, rinsing, and soaping, Bordeaux shades that are fast to light and wet processing.

A dyestuff of similar properties is obtained by using about 42 kg. 2-(3',6'-dichloropyridazine(1',2')-5'-carboxamido)-5-hydroxy-naphthaline-7-sulfonic acid for the formation of the dyestuff.

Example 8

A sulfochloride prepared in the usual manner at about 120–140° from 60 kg. copper phthalocyanine and about 600 kg. chloro-sulfonic acid is introduced, after its separation and pasting with iced water and neutralization, into a prepared neutral solution of 68.8 kg. 4,4'-diamino-diphenyl-2,2'-disulfonic acid. After adding 60 kg. pyridine, the mixture is stirred for several hours at 4–6°, is rendered alkaline with sodium carbonate, filtered to remove impurities, the dyestuff is precipitated from the filtrate by the addition of hydrochloric acid and sodium chloride, it is filtered off and washed with a sodium chloride solution containing hydrochloric acid to remove any non-reacted 4,4'-diamino-diphenyl-2,2'-disulfonic acid.

The dyestuff paste thus obtained is dissolved in water and excess sodium bicarbonate, and reacted with 3-chloro-pyridazine(1,2)-6-carboxylic acid chloride until a sample taken is no longer diazotizable. The dyestuff is precipitated by potassium chloride, filtered off, and dried. It is a green blue water-soluble powder and gives, when printed on cotton with alkali, urea, and alginate thickening, after steaming or dry-heating to 140–160°, rinsing and soaping, turquoise blue prints being fast to wet processing.

In the following table, there are indicated some further examples of dyestuffs that are obtained by starting from copper phthalocyanine sulfochloride, the diamino compound and the halopyridazine-carboxylic acid chloride, being, however, modified:

| Diamino Linkage | Halogeno-pyridazine-carboxylic acid chloride | Color Shade on Cotton or Regenerated Cellulose |
|---|---|---|
| $H_2N-\text{[benzene]}(-CH_3)(-NH_2)-SO_3H$ | $Cl-OC-\text{[pyridazine with Cl, N=N, Cl]}$ | Turquoise blue. |
| $H_3C-, H_2N-\text{[benzene]}(-NH_2)-SO_3H$ | Same as above | Do. |
| $H_2N-\text{[benzene]}-SO_2-\text{[benzene]}(-NH_2)(-SO_3H)$ | ......do............ | Do. |

| Diamino Linkage | Halogeno-pyridazine-carboxylic acid chloride | Color Shade on Cotton or Regenerated Cellulose |
|---|---|---|
| 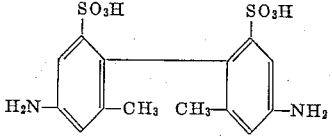 | 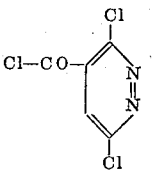 | Turquoise blue. |
| 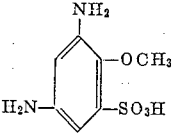 | Same as above | Do. |
| 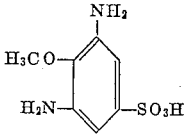 | ----do---- | Do. |
| 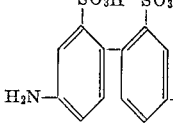 | 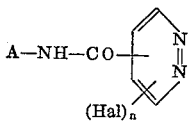 | Do. |
| Same as above | 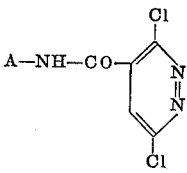 | Do. |
| Do | (Cl)(Cl)ClOC-pyridazine | Do. |

If, starting in the above examples from nickel phthalocyanine instead of copper phthalocyanine, there are obtained more greenish, in the case of using cobalt phthalocyanine, bluish or reddish turquoise blue shades. Starting, however, from tetraphenyl-copper-phthalocyanine or its sulfochloride, green dyestuffs of corresponding properties are obtained.

Example 9

27.9 kg. 4,4'-diaminodiphenylamine-2-sulfonic acid in the form of its sodium salt are dissolved neutral in water. 24.7 kg. 1-chloro-2,6-dinitrobenzene-4-carboxylic acid and 8.5 kg. anhydrous sodium acetate are added, the mixture is boiled for several hours and the condensation product precipitated as sodium salt.

Excess 3-chloro - pyridazine(1,2) - 6 - carboxylic acid chloride is added, at 5–10°, to the solution of sodium salt of the 4'-(4''-carboxy-2'',6''-dinitrophenylamino)-4-amino-diphenylamine-2-sulfonic acid admixed with excess sodium bicarbonate and the mixture is stirred until a free amino compound is no longer detectable. After separating, filtering off, and drying, a yellow brown water-soluble powder is obtained that furnishes, when printing in the presence of sodium carbonate, urea, and alginate thickening, after rinsing and soaping, yellow brown prints being fast to light and wet processing.

It will be understood that this invention is susceptible to further modification and, accordingly, it is desired to comprehend such modifications within this invention as may fall within the scope of the appended claims.

We claim:

1. A water-soluble reactive organic dyestuff of the formula:

A—NH—CO—[pyridazine ring with (Hal)$_n$]

wherein Hal is a member selected from the group consisting of chlorine and bromine, $n$ is an integer from 1 to 3, and A is the residue of an organic dyestuff selected from the group consisting of azo dyestuff, anthraquinone dyestuff, phthalocyanine dyestuff, and nitro dyestuff, said A containing an aryl nucleus and —NH—CO— being bonded directly to a carbon atom of said nucleus, said dyestuff containing at least one water solubilizing group.

2. A water-soluble reactive organic dyestuff of the formula:

A—NH—CO—[pyridazine ring with two Cl]

wherein A is the residue of an organic dyestuff selected from the group consisting of azo dyestuff, anthraquinone dyestuff, phthalocyanine dyestuff, and nitro dyestuff, said A containing an aryl nucleus and —NH—CO— being bonded directly to a carbon atom of said nucleus, said dyestuff containing at least one water solubilizing group.

3. A water-soluble reactive organic dyestuff of the formula:

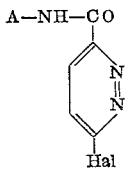

wherein Hal is a member of the group consisting of chlorine and bromine and A is the residue of an organic dyestuff selected from the group consisting of azo dyestuff, anthraquinone dyestuff, phthalocyanine dyestuff, and nitro dyestuff, said A containing an aryl nucleus and —NH—CO— being bonded directly to a carbon atom of said nucleus, said dyestuff containing at least one water solubilizing group.

4. A water-soluble reactive dyestuff according to claim 1 wherein $n$ is an integer from 1 to 2 and A is the residue of an azo dyestuff.

5. A water-soluble reactive dyestuff according to claim 1 wherein $n$ is an integer from 1 to 2 and A is the residue of an anthraquinone dyestuff.

6. A water-soluble reactive dyestuff according to claim 1 wherein $n$ is an integer from 1 to 3 and A is the residue of a phthalocyanine dyestuff.

7. A water-soluble reactive dyestuff according to claim 3 wherein A is the residue of a nitro dyestuff and Hal stands for chlorine.

References Cited

UNITED STATES PATENTS

| | | | |
|---|---|---|---|
| 3,127,389 | 3/1964 | Seitz et al. | 260—146 |
| 3,184,282 | 5/1965 | Cole et al. | 260—154 |
| 3,184,283 | 5/1965 | Cole et al. | 260—154 |
| 3,232,931 | 2/1966 | Rothman | 260—242 |

FOREIGN PATENTS

| | | |
|---|---|---|
| 1,266,733 | 6/1961 | France. |
| 1,336,679 | 7/1963 | France. |

CHARLES B. PARKER, *Primary Examiner.*

F. D. HIGEL, *Assistant Examiner.*